No. 744,286. Patented November 17, 1903.

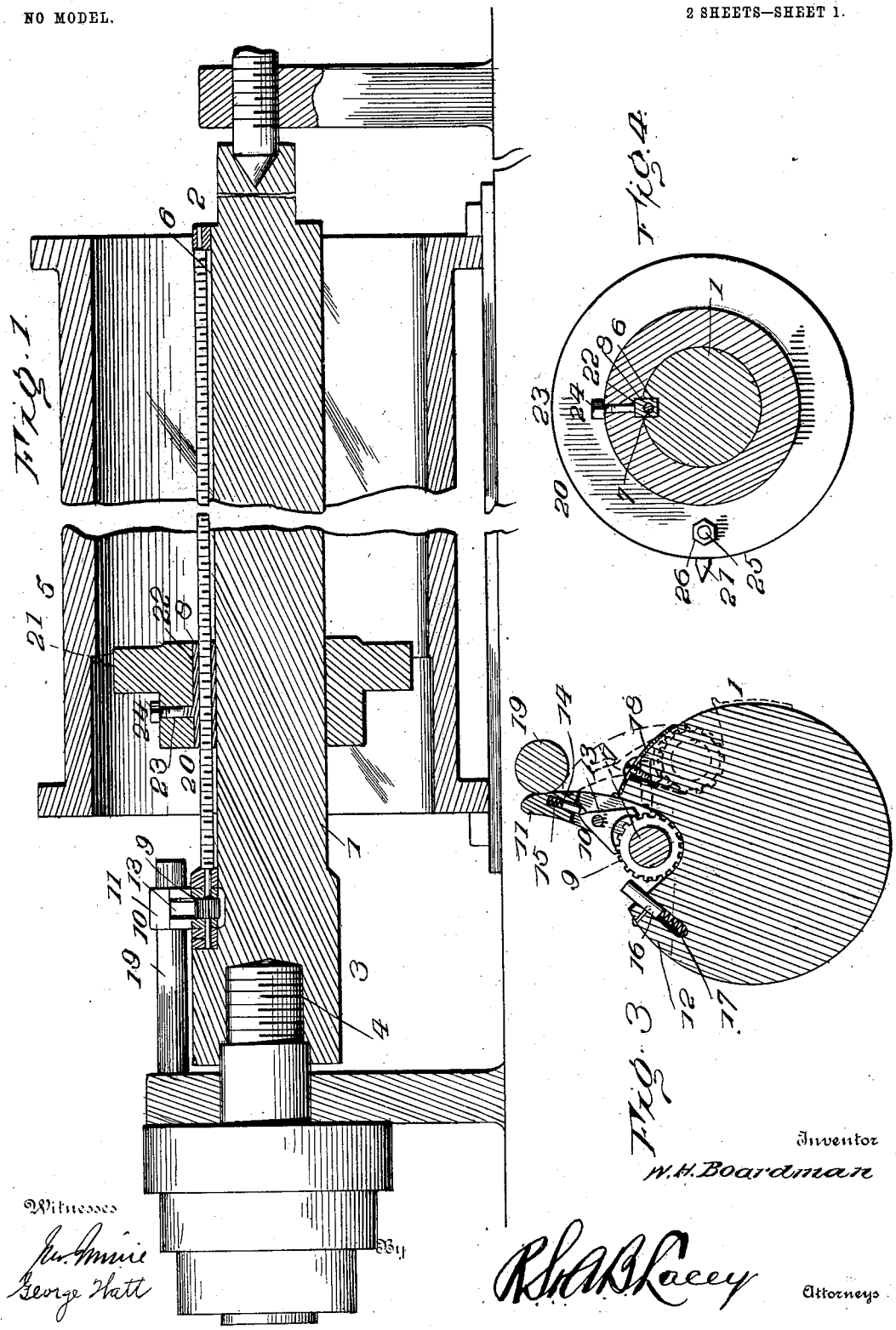

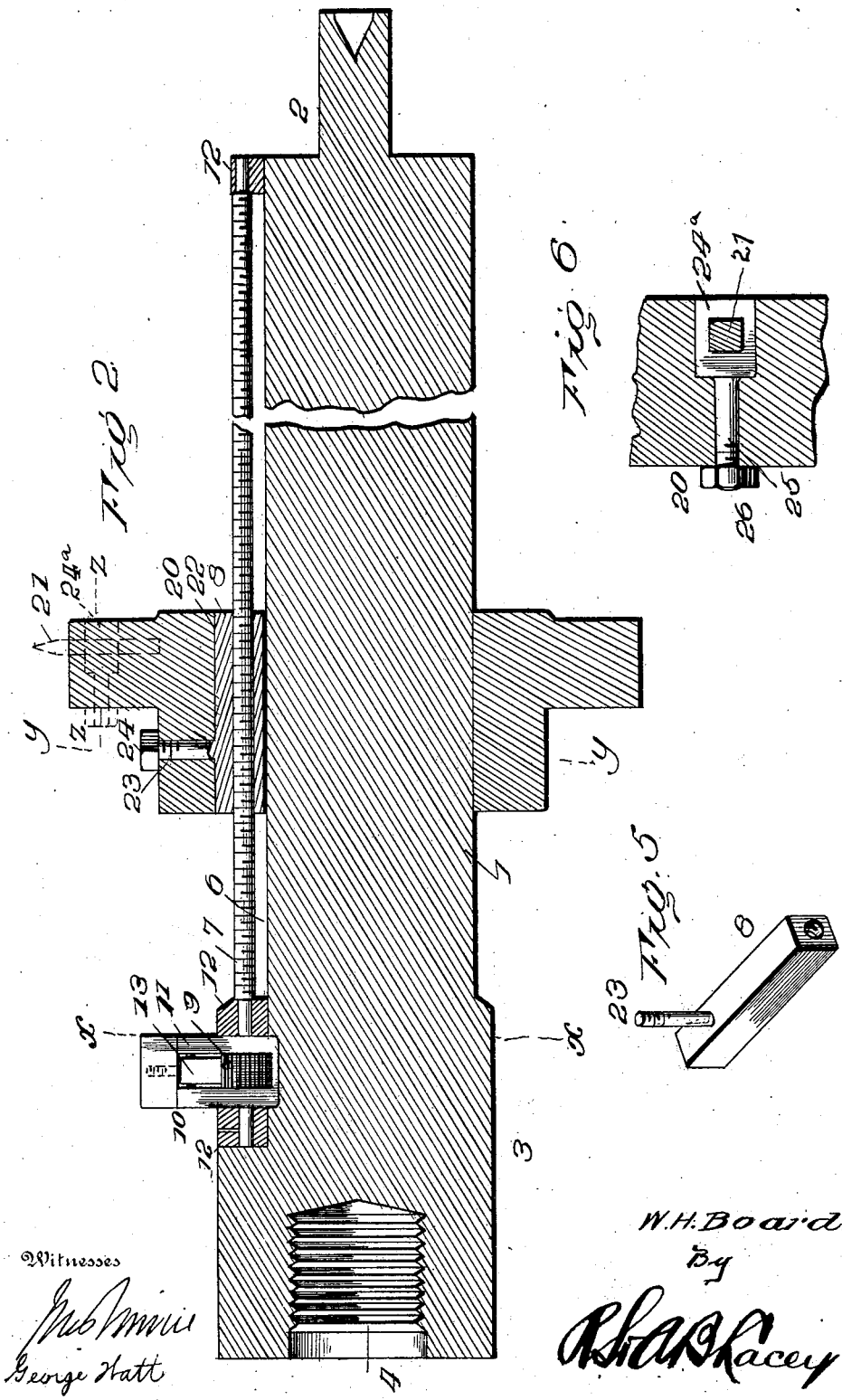

UNITED STATES PATENT OFFICE.

WILLIAM H. BOARDMAN, OF SCIO, OHIO.

BORING-BAR.

SPECIFICATION forming part of Letters Patent No. 744,286, dated November 17, 1903.

Application filed January 2, 1903. Serial No. 137,584. (No model.)

*To all whom it may concern:*

Be it known that I, WILLIAM H. BOARDMAN, a citizen of the United States, residing at Scio, in the county of Harrison and State of Ohio, have invented certain new and useful Improvements in Boring-Bars, of which the following is a specification.

The object of this invention is the provision of a boring-tool for engine-cylinders, which can be used with any lathe whether the shears are worn or in prime condition, as the accustomed carriage is dispensed with, the work being clamped to the bed of the lathe and the bar being swung between centers and secured to the head-spindle, so as to rotate therewith, the cutting-tool and the feed mechanism therefor being mounted upon the bar, the feed mechanism being regularly operated by a trip extended into the path of the feed-operating arm.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a detail view of a boring-bar embodying the invention, showing it in working position, the bar and cylinder being in longitudinal section and having an intermediate portion broken away. Fig. 2 is a central longitudinal section of the boring-bar on a larger scale. Fig. 3 is a section on the line X X of Fig. 2. Fig. 4 is a transverse section on the line Y Y of Fig. 2 on a reduced scale. Fig. 5 is a perspective view of the combined nut, key, and fastener. Fig. 6 is a detail section on the line Z Z of Fig. 2.

Corresponding and like parts are referred to in the following description and indicated in all the views of the drawings by the same reference characters.

The boring-bar 1 may be of any length and diametrical extent, depending upon the size of cylinder to be bored, and is constructed so as to be swung between the centers of a lathe suitable for this character of work. As shown, the bar 1 is circular in cross-section and is provided at one end with a journal 2 and at its opposite end with a head or enlargement 3, having an internally-threaded opening 4 for reception of the threaded end of the spindle of the lathe head-stock, the journal 2 being fitted to the center or analogous part of the lathe tailstock. The cylinder or work 5 to be bored is clamped to the bed of the lathe in any substantial way, and the bar 1 passes therethrough and in operation is rotated by means of the lathe in the accustomed way.

The bar 1 is provided in a side with a longitudinal groove or channel 6, forming a seat for reception of the feed-screw 7 and key 8, the feed-screw being journaled at its ends in bearings applied to the end portions of the boring-bar. The rear end of the feed-screw is made angular or otherwise constructed so as to receive a wrench or similar tool when it is required to rotate the feed-screw by hand to run the tool-carrier back upon the bar 1 to the starting or other required point. The inner end of the feed-screw is provided with a toothed wheel 9, keyed thereto so as to rotate therewith, the teeth being of such formation as to admit of coöperation with either end of a duplex pawl 10, pivoted to an operating-arm 11, loosely mounted upon the inner end of the feed-screw and slotted so as to embrace opposite sides of the toothed wheel 9. The bearings 12 for the feed-screw are of sectoral shape and are secured to cut-away portions of the bar 1. One bearing is provided for the outer end of the feed-screw and two bearings for the inner end, the latter bearings being spaced apart a distance to receive the operating-arm 11.

The operating-arm 11 is preferably curved and its inner end is bifurcated, so as to span the toothed wheel 9 and receive the duplex pawl 10, which is pivoted to the bifurcations and its outer end pointed and adapted to cooperate with a spring-actuated dog 13, by means of which the pawl is held in either of its extreme positions, so as to turn the feed-screw either to the right or to the left, as may be required. The dog 13 and actuating-spring 14 therefor are mounted in an opening 15, extended into the outer end of the operating-arm from the crotch, the dog projecting a distance so as to engage with the pawl and admit of a ratchet movement thereof in either position. The groove or seat 6 is widened opposite the toothed wheel 9 and operating-arm 11 to admit of proper oscillation of said operating-arm to insure actuation of the feeding mechanism. A buffer 16 is located at one side of the recess 17 and serves to effect a rebounding of the operating-arm to bring it into a normal position, and an adjustable stop 18 is located at the opposite side of the recess to limit the forward movement of the arm 11 and provided for regulating the feed of the cutting-tool. A stop 19 is located in the path of the arm 11 and trips the same at each revolution of the boring-bar, whereby the cutter is advanced.

The carrier 20 for the cutting-tool 21 is slidably mounted upon the bar 1 and consists of an annular head, its inner wall being provided with a groove or seat 22 to receive the outer portion of the key 8, the inner portion of said key entering the seat 6, whereby the said key serves to lock the carrier 20 to the boring-bar 1, while at the same time admitting of said carrier sliding freely thereon. The key 8 is longitudinally bored and internally threaded for reception of the feed-screw 7, and in this capacity acts as a nut. A stem 23 projects outward from the key 8 and passes through an opening of the tool-carrier 20 and receives a nut 24 upon its outer threaded end.

The cutter 21 is adjustably mounted in an opening of the tool-carrier 20 and is held in an adjusted position by a clamp consisting of a head 24$^a$, stem 25, and nut 26. The head is fitted in a recess formed in a side or face of the carrier 20 and is operated for reception of the cutter 21, and the stem 25 passes through an opening of the carrier 20, and its end portion is extended and threaded to receive the nut 26. Upon loosening the nut 26 the cutter 21 may be removed or adjusted to any desired position, and upon tightening the nut 26 lateral strain is imparted to the cutter sufficient to bind it in its opening and hold it in place.

A boring-bar constructed in accordance with this invention is swung between the centers of a suitable lathe and is adapted to be rotated thereby and passes centrally through the cylinder or work, which is clamped firmly to the bed of the lathe. The cutting-tool 21 is adjusted so as to take off a shaving of determinate size, and as the boring-bar is rotated the operating-arm 11 is oscillated by means of the trip 19 and buffer 16, thereby imparting a slow rotary movement to the feed-screw 7, by means of which the carrier 20 is advanced upon the boring-bar as the work progresses. When the cutting-tool reaches the end of the cylinder or work, it may be returned to a starting position either by reversing the pawl 10 or by turning the feed-screw 7 by hand, and to effect a further cutting it is necessary to move the tool 21 outward, when the operations may be repeated.

Having thus described the invention, what is claimed as new is—

1. In a boring-bar for engine-cylinders and like work, the combination of a tool-carrier mounted for sliding movement thereon, a feed-screw journaled to the boring-bar and adapted to effect a movement of the tool-carrier upon said bar, a toothed wheel secured to the feed-screw, an oscillatory operating-arm mounted in coaxial alinement with the feed-screw, a pawl applied to said arm for coöperation with the aforesaid toothed wheel to turn the feed-screw, means for tripping said arm in one direction, and a buffer repressed by the said arm to effect a rebound thereof to return it to a normal position when released from the tripping means, substantially as set forth.

2. In a boring-bar for engine-cylinders and like work, the combination of a tool-carrier mounted for sliding movement thereon, a feed-screw journaled to the boring-bar and adapted to effect a movement of the tool-carrier thereon, a toothed wheel secured to the feed-screw, an oscillatory operating-arm mounted upon the feed-screw and having portions embracing opposite sides of said toothed wheel, a reversible pawl pivoted in the crotch of the operating-arm and adapted to coöperate with the toothed wheel to effect turning of the feed-screw, an adjustable stop to limit the forward movement of the operating-arm, a stop for tripping said arm in one direction, and a buffer adapted to be repressed by the said arm to effect a rebound thereof to return it to a normal position when released from the tripping-stop, substantially as specified.

In testimony whereof I affix my signature in presence of two witnesses.

WILLIAM H. BOARDMAN. [L. S.]

Witnesses:
 JOHN H. WHITE,
 T. S. CRANSTON.